_(12)_ United States Patent
Chai et al.

(10) Patent No.: US 7,359,850 B2
(45) Date of Patent: Apr. 15, 2008

(54) SPELLING AND ENCODING METHOD FOR IDEOGRAPHIC SYMBOLS

(76) Inventors: David T. Chai, 11 Old Farm Rd., Holmdel, NJ (US) 07733; Sing H. Lin, 23 Seven Oaks Cir., Holmdel, NJ (US) 07733; Andrew A. Soong, 12 Ridge Rd., Colts Neck, NJ (US) 07722

( * ) Notice: Subject to any disclaimer, the term of this patent is extended or adjusted under 35 U.S.C. 154(b) by 847 days.

(21) Appl. No.: 10/672,336

(22) Filed: Sep. 26, 2003

(65) Prior Publication Data

US 2005/0080612 A1   Apr. 14, 2005

(51) Int. Cl.
*G06F 17/20* (2006.01)
(52) U.S. Cl. .......................................................... 704/8
(58) Field of Classification Search ...................... None
See application file for complete search history.

(56) References Cited

U.S. PATENT DOCUMENTS

| | | | |
|---|---|---|---|
| 4,379,288 A | 4/1983 | Leung et al. | |
| 4,462,703 A | 7/1984 | Lee | |
| 4,500,872 A | 2/1985 | Huang | |
| 4,505,602 A | 3/1985 | Wong | |
| 4,559,615 A | 12/1985 | Goo et al. | |
| 4,679,951 A * | 7/1987 | King et al. | 400/110 |
| 5,175,803 A | 12/1992 | Yeh | |
| 5,212,769 A | 5/1993 | Pong | |
| 5,236,268 A | 8/1993 | Chang | |
| 5,251,293 A | 10/1993 | Ishii et al. | |
| 5,319,552 A | 6/1994 | Zhong | |
| 5,410,306 A * | 4/1995 | Ye | 341/28 |
| 5,724,031 A | 3/1998 | Huang | |
| 6,024,289 A * | 2/2000 | Ackley | 235/494 |

FOREIGN PATENT DOCUMENTS

CN    1101567 C    2/2003

* cited by examiner

*Primary Examiner*—David Hudspeth
*Assistant Examiner*—Jakieda Jackson
(74) *Attorney, Agent, or Firm*—Richard L. Huff

(57) ABSTRACT

The present invention relates to a spelling and encoding method for ideographic symbols, such as Chinese characters. The spelling method can provide first and second components for identifying first and second groups of ideographic symbols, wherein the two groups can have at least one common ideographic symbol correlating with the two components. For example, the two components can be a Chinese Pinyin spelling and a Four Corner Numerical Index, respectively, which can each identify a group of Chinese characters and be combined to identify one or more characters. The spelling method can further provide a third component to differentiate a plurality of ideographic symbols common to the two groups to uniquely identify each common symbol. In one embodiment, an alphanumeric spelling can be provided to uniquely identify each ideographic symbol. The encoding method can encode various alphanumeric representations of the ideographic symbols by the 7-bit ASCII standard code.

8 Claims, No Drawings

SPELLING AND ENCODING METHOD FOR IDEOGRAPHIC SYMBOLS

FIELD OF THE INVENTION

The present invention relates to a spelling method for spelling various ideographic symbols. In particular, the present invention relates to a spelling method capable of spelling various ideographic symbols as alphanumerals and a method for managing information represented by the ideographic symbols. Additionally or alternatively, the present invention relates to a spelling capable of uniquely identifying an ideographic symbol. Furthermore, the present invention relates to an encoding method for encoding various alphanumerical representations of ideographic symbols.

BACKGROUND OF THE INVENTION

Various spelling systems or indexing systems have been attempted to represent ideographic symbols, such as Chinese, Japanese or Korean characters, Greek alphabets, mathematics symbols, and the like. For example, users of the Chinese language have been using the Pinyin system for more than 50 years and the Four Corner Numerical Index system for more than 70 years. The Pinyin system is a phonetic spelling system to both spell the sound and indicate the tone of each Chinese character. The Pinyin system can specify the pronunciation of every Chinese character. On the other hand, the Four Corner Numerical Index system has been used to index Chinese characters with one digit assigned to each of the four corners of the Chinese character based on the shape of the Chinese character. The rules for assigning a digit to each of the four corners are available in many Chinese dictionaries. A simple mnemonic song is also available in such dictionaries to help users to remember those rules.

Unlike the English-language, where a unique relationship exists between each spelling and its corresponding word, ideographic symbols do not always correlate to a unique spelling, if there exists such a spelling. For example, in the Chinese language, there is not a unique relationship between a Pinyin spelling and a specific Chinese character. The problem is known as the homotone problem in that many Chinese characters have exactly the same Pinyin spelling even after both the sound and the tone are specified. For example, the Pinyin spelling for the Chinese character "易" (meaning "easy") is "yi4" where "yi" represents the sound and the numeral "4" denotes the fourth tone. Among a set of 13,000 commonly used Chinese characters, there are 123 other different Chinese characters with different meanings but all are spelled exactly as "yi4". About 98.7% of Chinese characters have the homotone problem under the Pinyin system. Similarly, the Four Corner Numerical Index system also has a problem in its inability to specify each Chinese character uniquely. For example, among the commonly used 13,000 Chinese characters, there are 73 different Chinese characters with the same Four Corner Numerical Index of "4422". About 91.4% of Chinese characters have the non-uniqueness problem under the Four Corner Numerical Index system. Such non-unique relationship can lead to many serious problems when using the Chinese language in computers or e-mails as described below.

When inputting Chinese characters into computers using the Pinyin spelling method, a user may encounter following problems: (1) to stop at 98.7% of Chinese characters, (2) to scroll through and to stare very hard at several lists of many homotones on the monitor screen, and (3) to select the particular character that the user wants to input one Chinese character into the computer. In the worst case, to input the Chinese character spelled as "yi4", the user has to stare at each of the 124 homotones displayed on the screen to find and to select a particular one that the user wants before the user can move on to try to enter the next character. The user must stare very hard at these lists of homotones to pick the desired character because many Chinese characters are very complicated, packing a large number (e.g., more than 50) of strokes inside a tiny space on the screen. This is obviously a very slow and painful process for inputting Chinese-language information into computers.

There has been a very strong demand and a large market for many software companies to develop and to sell more than 60 different methods and techniques designed to speed up this very painful and slow process of Chinese character input. The speed of Chinese character input using these special and tricky methods are proportional to the amount of effort and special training to memorize many illogical rules. It is obviously a heavy burden on the users to learn and remember such special and tricky methods.

Moreover, neither the Pinyin code nor the Four Corner Numerical Index alone is adequate to represent a Chinese character in computer usage because computer processing requires a unique relationship between the code and the word or character represented. Such deficiency forced the existing Chinese-language computer interface systems to encode many thousand (e.g., 13,000) Chinese characters directly. The direct encoding system makes it difficult to manage Chinese-language information in the computers because these many thousands of Chinese characters do not have any logical order. The information management functions, such as indexing, sorting, listing, organizing, searching and retrieving, of the Chinese-language based information have been difficult and inefficient both inside the computer and outside computer usage. For example, if the user sorts the names of the provinces in China by the current GB internal code, the sorting result cannot provide logical order of the province names.

For example, more than 90% of Chinese-language books have no index to help readers to find information in the book quickly. Some Chinese dictionaries and libraries provide an index system using (a) number of strokes of Chinese characters followed by (b) the radicals (i.e., the building blocks or roots) of Chinese characters. However, the maximum number of strokes of complicated Chinese character can be more than 50 and there are 217 radicals of Chinese characters. There are often very large number (e.g., more than 400) of Chinese characters with the same number of strokes. Such large groups of Chinese characters have to be further divided into smaller groups according to the 217 radicals. The logical sequence of such 217 radicals is nearly impossible for users to remember and is therefore very cumbersome and inefficient for practical use. Furthermore, for many complicated Chinese characters with 10 strokes or more, the number of strokes in each character is not easy to count. It is therefore burdensome for the user to figure out the correct number of strokes in such a complicated character. Chinese-language users have been struggling with the existing poor and inefficient index systems for many years.

English-language computer interface systems use the 26 English alphabetic letters, which are encoded by the 7-bit ASCII (American Standard Code for Information Interchange) code. The 128 possible combinations in the 7-bit ASCII code can accommodate encoding of all 26 upper case and 26 lower case English alphabetic letters, the 10 Arabic numerals, the commonly used punctuation marks and the necessary control characters. In the English-language computer encoding system, one overhead bit is added to the 7-bit ASCII encoded English information content to form an 8-bit byte. The leading bit in the 8-bit byte is set to the value of "0" to signal to computers that this 8-bit byte represents an alphanumeral in the remaining 7-bit.

In contrast, the 128 possible combinations of the 7-bit ASCII code are not big enough to code many thousand (e.g., 13,000) Chinese characters plus the necessary control characters. Therefore, the existing Chinese computer encoding systems use the 2-byte 16-bit encoding system to provide enough coding space to encode all the Chinese characters. The leading bit of the first byte of a 2-byte pair is set to the value of "1" to tell computers that each pair of such two consecutive 8-bit bytes represent a single Chinese character. Consequently, the leading bit of the second 8-bit byte in each pair is no longer an overhead bit but is a significant bit carrying Chinese-language information. The different encoding systems between the English-language and the Chinese-language can cause various problems as described below.

Most e-mail systems were originally designed for 1-byte encoded English language and many e-mail systems (but not all) often strip off the leading overhead bit of the 8-bit byte in their various e-mail processing functions. Stripping off the leading overhead bit is acceptable for English-language e-mails because the real information contents are in the remaining 7 bits. However, stripping off the leading bit in each 8-bit byte in Chinese-language e-mails causes the following two levels of fatal destruction of Chinese-language information content in such e-mails: (1) Each pair of 8-bit bytes representing a single Chinese character is cut into two halves and the e-mail system misinterprets each half as an English alphabetic letter, and (2) The leading bit, carrying Chinese-language information, of the second byte in each pair is stripped off and threw away by the e-mail system. The e-mail systems present a question mark for each destroyed Chinese character on the computer screen to the recipient of the Chinese-language e-mail. Consequently, the entire Chinese-language e-mail becomes meaningless (e.g., all question marks instead of Chinese characters) for the recipient. The recipient will not be able to recover or reconstruct the Chinese-language information content because these two levels of destruction are fatal.

The 2-byte 16-bit encoding problem exists despite the effort of upgrading various computers and Internet processors to the new international Unicode standard with 16-bit 2-byte encoding. Theoretically this is a simple upgrade operation. But practically the upgrade is not easy to complete because of the large number of computers, servers and processors used. Software engineers must search to find all 1-byte operations in large and complex software systems originally developed for 1-byte English-language operation. In a large and complex e-mail system having many different functions and branches where issues of 2-byte vs. 1-byte processing can be buried in many different places, it is not a trivial matter to find and upgrade all of the 1-byte operations. Thus, even in some supposedly upgraded e-mail systems, Chinese-language information can still get clobbered and destroyed. For example, although a Chinese-language e-mail may appear acceptable upon receipt, it may become illegible when the recipient presses the "Reply" or "Forward" button. This is because some 1-byte operations are still hidden in the large and complex software system and are triggered by pressing the "Reply" or "Forward" button. Even though the 2-byte international Unicode standard has been established and used for quite a few years now, such destruction problems of Chinese-language information still persist today. Furthermore, although the newer 4-byte 32-bit encoding system is considered to be able to accommodate all major languages, all Internet processors and e-mail systems in many servers and computers will have to go through another round of very long transition from the yet uncompleted worldwide 2-byte systems to the newer 4-byte systems.

At present, several different and incompatible encoding systems are being used to encode Chinese characters. If the Chinese-language encoding system in the recipient's computer is different from that in sender's computer, the Chinese characters in the received computer file often become blank square boxes, or strange symbols (e.g., Greek alphabetic letters) or wrong Chinese characters that appear normal on the surface but the real Chinese information contents are unreadable. Although such incompatibility problems do not destroy the Chinese-language information, they are very disturbing to the users and can greatly reduce the user's efficiency. Moreover, it requires advanced knowledge and skill of Chinese-language computer processing and special procedures to recover the Chinese-language information. For example, the user must change and cycle through many different sets of Chinese encoding systems in the computers to find the correct set to match the encoding system used by the sender. Further, special procedures vary depending on the application program being used, such as different e-mail systems (e.g., Microsoft Outlook, AOL, Yahoo, etc.), web browsers, Microsoft Word, PowerPoint, Excel, etc. It is nearly impossible to learn all the necessary skills to deal with the variations of special procedures to find the correct match of the encoding system.

There are other problems in processing Chinese-language e-mails or computer files in English-language operating systems. For example, if a computer file name contains 2-byte encoded Chinese characters, an English-language operating system cannot process such a file because the operating system does not recognize the file name and consequently cannot find such file. Special procedures are required to remove the Chinese characters from the file name before such file can be processed properly.

Moreover, many printer drivers are designed to process only 1-byte encoded English-language information in English-language operating systems. Such printers cannot process the 2-byte encoded Chinese characters but print them as blank squares. A Chinese software platform must be used on the English-language operating systems before the printers can print Chinese characters properly. Further, if a Chinese-language computer file contains tables or figures, the printed Chinese characters may not line up properly but appear in a chaotic fashion even when a Chinese software platform is used.

Moreover, some e-mail systems may convert the Chinese-language e-mail text improperly and display many pages of strings of computer internal codes that look like "ｗｉｓ". Advanced knowledge and special procedures are required to convert such computer internal codes to meaningful Chinese texts.

Additionally, if an English-language operating system is not equipped with Chinese-language support package software, the user must go through special procedure to download the Chinese language support package software from the relevant website or from the suitable CD. Otherwise, the user will not be able to use the English-language operating system to process Chinese-language e-mails or files or to surf Chinese-language websites.

The above problems have caused various inconveniences for users of Chinese language for many years. Much work has been done in an attempt to solve these problems, but no satisfactory solution has been found, which can easily be used, or has been available and accepted by the majority users of the Chinese language.

The present invention can overcome the above problems. The present invention provides a spelling system for various ideographic symbols. Moreover, the present invention provides a spelling system capable of uniquely spelling various ideographic symbols and a method for managing information represented by the ideographic symbols. Further, the present invention provides a spelling system capable of uniquely identifying an ideographic symbol. Furthermore, the present invention provides an encoding system for encoding various alphanumerical representations of ideographic symbols.

SUMMARY OF THE INVENTION

The present invention relates generally to a spelling method for spelling various ideographic symbols. The spelling method can provide first and second component representing first and second groups of ideographic symbols, respectively. The first and second groups can comprise one or more common ideographic symbols, which can be identified by a spelling system formed by the first and second components. According to one aspect of the invention, the spelling method is capable of providing an alphanumeric representation of an ideographic symbol. According to another aspect of the present invention, the spelling method is capable of providing a unique alphanumeric representation to identify an ideographic symbol. The spelling method can enable sorting and/or indexing of the ideographical symbols in a logical order, such as an alphanumerical order.

The present invention also relates to a spelling capable of representing an ideographic symbol. The spelling can comprise first and second components for identifying first and second groups of ideographic symbols, respectively. The first and second groups can comprise at least one common ideographic symbol, which is identified by the first and second components. According to one aspect of the invention, a third component can be provided to differentiate a plurality of common ideographic symbols and uniquely identify each of the common ideographic symbols when the first and second groups comprise more than one common symbols. According to one aspect of the invention, the spelling can comprise one or more alphanumerals to provide an alphanumerical representation of a corresponding ideographic symbol.

The present invention further relates to an encoding method for encoding various alphanumeric representations of ideographic symbols. Instead of an "arbitrary" mapping of the various ideographic symbols as 16-bit strings, the encoding method can encode the alphanumeric representations of various ideographic symbols as 1-byte 8-bit internal codes for computer processing, such as file save and e-mail transmission. Accordingly, information containing various ideographic symbols can be processed similarly to that of the English-language.

DETAILED DESCRIPTION OF THE INVENTION

According to one aspect of the present invention, a spelling method can be provided to spell an ideographic symbol. Ideographic symbols are typically pictorial representations of words, characters, alphabetic letters, or other elements in a non-English language, such as Chinese, Japanese or Korean characters, Japanese Katakana, Chinese Zhuyin symbols, Greek alphabetic letters, Roman numerals, non-English language punctuation marks, mathematics symbols, icons, and the like.

The spelling method can provide first and second components for representing first and second groups of ideographic symbols, respectively. In one exemplary embodiment, at least one of the components can represent the respective group of ideographic symbols by their various features. In an exemplary embodiment, the first component can identify a group of ideographic symbols by a phonetic system. For example, the first component can be the Pinyin or Zhuyin spelling of a Chinese character. In another exemplary embodiment, the first component can be provided to represent one type of ideographic symbols, such as Roman numerals, Greek symbols, Zhuyin symbols, mathematics symbols, etc. In another exemplary embodiment, the second component can identify a group of ideographic symbols by a shape based index system. For example, the second component can be the Four Corner Index code of a Chinese character. It will be appreciated that other embodiments of the first and second components are also within the scope of the present invention.

According to another aspect of the present invention, the spelling method is capable of providing an alphamumeric representation of an ideographic symbol. For example, the spelling method can identify one or more common ideographic symbols, which are represented by the first and second components. In one exemplary embodiment, the first and second components each can comprise a series of alphanumerals as will be discussed in great detail below. The term "alphanumeral" or "alphanumerals" herein refers to one or more of the 26 English-language alphabetic letters (i.e., a, b, c, d, . . . , x, y, and z), regardless of the upper case or lower case format, and the 10 single digit Arabic numerals (i.e., 0, 1, 2, 3, . . . , 7, 8, and 9).

According to another aspect of the present invention, the spelling method can provide a third component to differentiate a plurality of ideographic symbols common to the first and second groups and uniquely identifying each of the common ideographic symbols. In an exemplary embodiment, the third component can be one or more alphanumerals, which correspond to the one or more common ideographic symbols identified by the first and second components. In an exemplary embodiment, the third component can be a single alphanumeral. It will be appreciated that other embodiments of the spelling method are also within the scope of the present invention.

The present invention can also provide a spelling that is capable of identifying an ideographic symbol. In one exemplary embodiment, the spelling can comprise first and second components representing first and second groups of ideographic symbols, respectively, wherein the first and second groups can comprise one or more common ideographic symbols. The common ideographic symbols can be identified by the first and second components, which can form the spelling in various manners as will be described in great detail below.

The first and second components each can identify their respective groups in various manners. In one exemplary embodiment, the first component can be a phonetic spelling of the ideographic symbol. For example, the first component can be Pinyin or Zhuyin spelling of a Chinese character. In an exemplary embodiment, the first component can comprise a sound portion and a tone portion of a Chinese character, such as the sound and tone in the Pinyin spelling of the Chinese character. In another exemplary embodiment, the four tones and the light tone in the Pinyin system can be represented by Arabic numerals 1, 2, 3, 4, and 5, respectively. In another exemplary embodiment, the second component can comprise a shape-based component to represent the ideographic symbol. For example, various existing shape-based spelling methods can be used to form the second component. In an exemplary embodiment where the ideographic symbols are Chinese characters, the second component can be an index code formed in accordance with the existing Four Corner Numerical Index System or Five Stroke Index System.

In an alternative exemplary embodiment, the first component can identify the first group of ideographic symbols by their various natures. For example, the first component can designate the various types of ideographic symbols. In an exemplary embodiment, the first component can be formed to identify a group of non-pronounceable Chinese characters, such as Roman numerals or Greek alphabetic letters. Exemplary first components will be described in the exemplary embodiments below. In another exemplary embodiment, the second component can be formed to uniquely identify the non-pronounceable Chinese characters in each group identified by the first component. In one exemplary embodiment, the second component can be an index code formed in accordance with the GB or Big5 Encoding system to identify an ideographic symbol. Exemplary second components are described in the exemplary embodiments below.

Additionally or alternatively, the first and second components each can be in various forms. In an exemplary example, the first and second components each can comprise one or more alphanumerals. For example, the components each can comprise a series of alphanumerals. In an exemplary embodiment, the first component can comprise one or more of the 26 English-language alphabetic letters. In another exemplary embodiment, the first component can comprise one or more of the 26 English-language alphabetic letters and one or more of the 10 single digit Arabic numerals. In a further exemplary embodiment, the second component can comprise one or more of the 10 Arabic numerals. It will be appreciated that other embodiments of the first and second components are also within the scope of the present invention.

In a further exemplary embodiment, the spelling system can comprise a third component to differentiate a plurality of ideographic symbols common to the first and second groups and uniquely identify each of the common ideographic symbols. The third component can be in various forms. For example, the third component can comprise one or more alphanumerals. In an exemplary embodiment, the third component can assume one or more of the 26 English-language alphabets and/or any Arabic numerals. In another exemplary embodiment, the third component can comprise a single alphanumeral. In a further exemplary embodiment, the third component can be one of the first four English-language alphabetic letters a, b, c, and d. It will be appreciated that other embodiments of the third component are also within the scope of the present invention.

The spelling can be formed in various manners to identify an ideographic symbol. In one exemplary embodiment, the spelling can be formed by combining the alphamurals of the first and second components. For example, the spelling can comprise a series of alphanumerals formed by those of the first and second components in that order. In another exemplary embodiment, the spelling can be formed by combining the alphanumerals of the first, the second, and the third component in that order. The various spellings can have a variable length, similar to that of English-language words. For example, depending on the type each component adopts or the presence of the third component, the spellings can have different numbers of alphanumerals. It will be appreciated that other embodiments of the spelling system are also within the scope of the present invention.

The present invention is capable of eliminating the difficulties in inputting ideographic symbols from a conventional computer keyboard. One reason is that the spelling is capable of identifying each of the ideographic symbol uniquely. For example, users can just keep on typing the spellings of the ideographic symbols on the keyboard for rapid input without stopping to select desired Chinese characters from a large group of homotones. In an exemplary embodiment, the spellings can be used with any commercially available Chinese word processors, such as NJ Star, RichWin, Jiao, etc. Additionally or alternatively, because the spellings are formed using standard English-language alphabetic letters and Arabic numerals, standard English-language computer keyboards can be used for inputting ideographic symbols. Accordingly, there is no need for overlay of special and unfamiliar new symbols on the keyboard.

Additionally or alternatively, the present invention can allow an efficient and simple management of information containing ideographic symbols. For example, the present invention can enable information management by, such as indexing, sorting, listing, organizing, searching, retrieving, and the like. In one exemplary embodiment, the spellings of the various ideographic symbols can be formed by a series of alphanumerals. Such alphanumeric representations of the ideographic symbols can have a logical alphanumeric order, such as alphabetic and/or numeric order. In an exemplary embodiment, the alphanumeric representations of the ideographic symbols can be sorted in the numeric order followed by the English-language alphabetic order (i.e., 0, 1, 2, 3, . . . , 7, 8, 9, a, b, c, d, . . . , x, y, and z). Thus, the ideographic symbols can be sorted in a logic alphanumeric order through their alphanumeric representations, which can be easily remembered by users. In an exemplary embodiment, the spellings can allow indexing of information in non-English language books, business cards, telephone directories, and maps as well as indexing of the large number of non-English language books in libraries, name lists of club members, and the like.

The management of ideographic symbol information can be carried out in relation to either computer or non-computer usage. In an exemplary embodiment, when a book is completed through a word processor that uses the spellings, an index can be generated based on the alphabetical order of the spellings. In another exemplary embodiment, when using spreadsheet for various forms of analysis, the present invention allows for sorting the information. For example, when analyzing a spreadsheet containing, e.g., the names of the Chinese provinces (including municipalities and autonomous regions), the population, the area, the GDP, etc., the user can sort each of the columns. If the GDP per capita is desired, the user can create a new column by dividing GDP by the population and sort the new column.

According to another aspect of the present invention, an encoding method can be provided to encode various alphanumeric representations of the various ideographic symbols to facilitate various computer processing of information contain ideographic symbols. In one embodiment, the encoding method can encode the spellings by 7-bit ASCII standard codes, similar to that of English words. The spellings so encoded can allow information containing ideographic symbols to be sent through Internet or e-mail networks of various kinds of old and new e-mail systems and processors, similar to that of English-language information. Accordingly, the encoding method is capable of eliminating the various problems caused by 2-byte 16-bit encoded ideographic symbols.

According to a further aspect of the present invention, various mapping devices can be provided to facilitate the conversion between the spelling systems and the corresponding ideographic symbols. For example, a mapping device can be provided to demonstrate the correlation between the spelling systems and the corresponding ideographic symbols. In one exemplary embodiment, the mapping device can comprise a table mapping between the spelling systems and the uniquely associated ideographic symbols. The mapping table can be constructed in various formats. In an exemplary embodiment, a two-column table can be provided to map the 13,000 Chinese characters, wherein one column can comprise the 13,000 spellings while the other column the corresponding Chinese characters. Exemplary mapping tables will be described in connection with the exemplary embodiments below.

The mapping table can be easily edited. In an exemplary embodiment, the mapping table can be sorted, such as in the alphanumeric order. In another exemplary embodiment, the mapping table is open-ended so that one or more spellings can be added, which identify additional, new ideographic symbols. Such a new mapping table can be similarly sorted, such as in the alphanumeric order. It will be appreciated that other embodiments of the mapping table and/or mapping device are also within the scope of the present invention.

Additionally or alternatively, the correlation between the spellings and the ideographic symbols can be displayed on a computer monitor or printed papers. In one exemplary embodiment, a computer user can be provided with a paper copy of the mapping table, such as for use in inputting the ideographic symbols into the computer.

The present invention can be implemented in personal computers, mobile phones, personal digital assistant (PDA), mainframe computers, Internet servers, automatic teller machines (ATM's), and other information technology devices and systems. For example, various computer readable media can be provided to direct or instruct the computer to perform various functions. In one exemplary embodiment, various computer readable media can be provided to facilitate in entering the various ideographic symbols. In an exemplary embodiment, a translation software can be provided to enable the computer to translate the spellings into their uniquely correlated ideographic symbols. In another exemplary embodiment, a translation software can enable the computer to receive a spelling, fetch an ideographic symbol uniquely correlated with the spelling, and output the ideographic symbol. The translation software can be constructed in various forms. For example, the translation software is capable of directing the computer to display the identified or chosen ideographic symbol on the monitor after the user enters the corresponding spelling thereof. Such translation software can be either very rudimentary or quite sophisticated with various kinds of computer assistance to the user in entering the spellings, such as sounding out the word, spelling checking, correcting spelling errors when needed, providing choices and suggestions on correct spelling to the user when needed, and the like.

In another exemplary embodiment, various computer readable media can be provided to accommodate the existing methods for inputting ideographic symbols. In one exemplary embodiment, a computer readable medium can be provided to convert an existing code used in Chinese computer encoding systems into the corresponding spelling of this invention. For example, a computer readable medium can comprise a converting table. In an exemplary embodiment, the converting table can be provided to map from the existing GB codes to the spellings of this invention and vice versa. In another exemplary embodiment, a converting table can be provided to map from the existing BigS codes to the spellings of this invention and vice versa. Thus, users who are familiar with the various existing input methods, such as Pinyin based method, Zhuyin based method, shape or radical based method, Four Corner Index based method, etc., can continue to use these methods to input ideographic symbols. It will be appreciated that other embodiments of the converting table are also within the scope of the present invention.

Therefore, the present invention is capable of spelling an ideographic symbol as a series of alphanumerals. Such an alphanumeric representation of the ideographic symbol can carry out one or more of the following: (1) allow users to remember the small set of alphanumerals for forming a spelling system of an ideographic symbol; (2) provide a logical order of the various ideographic symbol to enable effective management of information containing ideographic symbols; (3) be fit within the coding space, such as the 128 possibilities of a 7-bit code with sufficient room for necessary control codes; and (4) allow computer encoding systems to encode the spellings, instead of many thousands ideographic characters (e.g., more than 13,000 Chinese characters) directly.

Additionally or alternatively, the present invention is capable of carrying out one or more of the following: (1) providing a logical method for entering various ideographic symbols into computers, such as through a conventional keyboard; (2) providing an efficient and simple method for managing ideographic symbol based information, including indexing, sorting, listing, organizing, searching, retrieving; (3) providing an efficient and user-friendly method for data processing and word processing of the various ideographic symbols; and (4) allowing users to send ideographic symbol based information through Internet or e-mail networks in a robust fashion, similar to that of English-language text.

Various embodiments of the spelling systems and the encoding system embodying the principles of the present invention will be described in great detail below.

In one exemplary embodiment, the spelling system can be provided to identify various Chinese characters. For example, the first component can be a phonetic spelling component of a Chinese character. Various phonetic spelling methods can be used to form the phonetic spelling component. In an exemplary embodiment, the first component can comprise a Chinese Pinyin spelling system formed according to the existing Chinese Pinyin National Standard. For example, the first component can comprise a sound portion formed with one or more Pinyin symbols and a tone portion designating the tone of the Chinese character. In an exemplary embodiment, the Pinyin symbols can be represented by English-language alphabetic letters. In another exemplary embodiment, the four tones plus the neutral (i.e., light) tone of Chinese characters can be represented by five Arabic numerals, respectively. For example, the four tones plus the neutral tone of Chinese characters can be represented by five Arabic numerals, such as 1, 2, 3, 4, and 5, respectively. In an alternative exemplary embodiment, the first component can comprise a Chinese Zhuyin spelling system formed according to the existing Chinese Zhuyin Standard. For example, the first component can comprise one or more of the 36 Zhuyin symbols. It will be appreciated that other embodiments of the first component are also within the scope of the present invention.

In another exemplary embodiment, the second component can be a shape-based component of a Chinese character. Various shape-based spelling methods can be used to form the second component. In an exemplary embodiment, the second component can be formed by the Four Corner Numerical Index system. It will be appreciated that other embodiments of the second component are also within the scope of the present invention.

When the Pinyin standard and the Four Corner Numerical Index system are combined to "spell" Chinese characters, the occurrence of plural Chinese characters with the same-spelling is reduced drastically from 98.7% down to 7.7% based on the analysis of a set of 13,000 commonly used Chinese characters. In each occurrence however, the number of different Chinese characters with the same Pinyin and Four Corner Numerical Index can be two, three, or at most four based on the analysis of the 13,000 Chinese characters. In addition, the situation where four different Chinese characters have the same Pinyin and Four Corner Numerical Index occurs only once in the entire set of 13,000 Chinese characters. In other words, it is rare that four or more different Chinese characters have exactly the same sound, the same tone and the same shape (i.e., same Four Corner Numerical Indices on all four corners).

The exemplary spelling system described above is easy for users of Chinese language to learn and use because the Pinyin or Zhuyin standard and the Four Corner Numerical Index system have been used for many years. The term "users of Chinese language" used here can include not only Chinese people but also many foreigners who have learned both spoken and written Chinese language.

In one exemplary embodiment, a third component can be provided to further differentiate plural different Chinese characters having the same Pinyin and Four Corner Numerical Index. In an exemplary embodiment, the third component can comprise a single alphanumeral. For example, the single alphanumeral can assume any of the 26 English alphabetic letters a, b, c, . . . , x, y, and z or the 10 Arabic numerals 0, 1, 2, 3, . . . , 7, 8, and 9. Because only two to four different Chinese characters may be left after employing the combined spelling of Pinyin and Four Corner Numerical Index, such single alphanumeral third component can be sufficient to distinguish the remaining two, three, or four Chinese characters. Therefore, with the use of the third component, the spelling system is capable of uniquely identifying all Chinese characters. It will be appreciated that other embodiments of the third component are also within the scope of the present invention.

The spelling systems for Chinese characters can have a variable length, similar to English words. For example, when the first component uses a Pinyin spelling, the first component can have a variable length from one to six English-language alphabetic letters. Additionally or alternatively, different numbers of the components can be used to form spelling systems for Chinese characters. For example, among a set of commonly used 13,000 Chinese characters, only 7.7% of them require the use of all three components of the spelling system in order to be uniquely identified. The rest 92.3% of the Chinese characters can be spelled uniquely by using only the first and second components. Moreover, about 58% of Chinese characters can be uniquely spelled by only the Pinyin component plus the first 2 digits (or less) of the Four Corner Numerical Index. In an exemplary embodiment, such as shown below, the Chinese character "白" can be uniquely identified by the first component (i.e., the phonetic component, such as the Pinyin spelling) although the second component can still be used in the spelling system.

Table 1 illustrates an exemplary spelling system, which can be used to spell various Chinese characters. In an exemplary embodiment, the spelling system can comprise the following portions and components: (a) a sound portion, such as the sound portion of Pinyin spelling, (b) a tone portion, such as the Pinyin tone, (c) a shape-based component, such as the Four Corner Numerical Index, and (d) a differentiator component, such as a single alphanumeral.

TABLE 1

The Components of the Spelling System

| Components of the Spelling System | Phonetic Component | | Shape-based Component - 形 (e.g, Four Corner Numerical Index) | Differentiator Component - 辨码 |
|---|---|---|---|---|
| | Sound portion - 音 (e.g., Sound of Pinyin) | Tone portion - 调 (e.g., Tone of Pinyin) | | |
| Number of alphanumeral used | Variable number of alphabetic letters | 1 digit of Arabic numeral | 4 digits of Arabic numerals | single alphanumeral |

Table 2 illustrates various components of seven sample spellings for seven Chinese characters. As is discussed below, the spelling method can uniquely spell Chinese characters having (1) same pronunciation but different shape structures or meanings, (2) same pronunciation and meaning but different shape structures, or (3) same shape structure but different pronunciations or meanings.

TABLE 2

Sample Spellings of Chinese Characters

| Sample Chinese Characters | Phonetic Component (e.g., Pinyin) (Sound) | (Tone) | Shape-based Component (e.g., Four Corner Numerical Index) | Differentiator Component | English-language Translation |
|---|---|---|---|---|---|
| 仿 | Fang | 3 | 2022 | a | Imitation |
| 彷 | Fang | 3 | 2022 | b | Seemingly |
| 白 | Bai | 2 | | | White |
| 华 | Hua | 2 | 2440 | | Magnificent |
| 華 | Hua | 2 | 4450 | | Magnificent |
| 行 | Xing | 2 | 2122 | | Walking |
| 行 | Hang | 2 | 2122 | | Line |

In an exemplary embodiment, such as shown in Table 2, the first two Chinese characters, "仿" and "彷", have the same Pinyin spelling and shape structure on four corners. In one exemplary embodiment, a third component can be provided as a differentiator component to thereby form the unique spellings of the two Chinese characters respectively. In an exemplary embodiment, the third embodiment can be designated with "a" and "b" respectively to distinguish the two Chinese characters.

In another exemplar embodiment, such as shown in Table 2, the third Chinese character "白" requires only the first component to achieve the unique spelling. In other words, neither the second nor the third component is necessary to achieve the unique spelling for "白" although the second component can still be used in the spelling system.

In a further exemplary embodiment, such as shown in Table 2, the fourth and fifth characters "华" and "華" are the simplified and traditional versions of the same Chinese character with the same meaning (meaning "magnificent"). The phonetic portion of the spellings of both characters can have the same Pinyin spelling of "hua2". But the two characters have different physical shapes because the simplified version has a reduced number of strokes. Due to shape difference, the two characters can have different shape-based components. In an exemplary embodiment, the two characters have different Four Corner Numerical Indices of "2440" and "4450", respectively, such as shown in Table 2. The present invention is capable of providing two different spellings for these two characters even though they have the same meaning, the same sound, and same tone.

There are a number of Chinese characters, each of which can have two or more different pronunciations and corresponding different meanings. In one exemplary embodiment, such as shown in Table 2, the sixth and seventh Chinese character "行" can be pronounced differently (such as "xing2" and "hang2" under the Pinyin system) and have different meanings (such as "walking" and "line" respectively). In an exemplary embodiment, each of such characters can have different spellings that contain different Pinyin spellings corresponding to the different meanings even though the Chinese character is the same. For example, the different spellings of the differently pronounced same Chinese character "行" can be different, such as shown in Tables 2 and 3.

By removing the explaining notes in Table 2, the spellings for these seven sample Chinese characters are as shown in the following Table 3.

TABLE 3

The Spellings for Seven Sample Chinese Characters

| Chinese Characters | Spellings |
|---|---|
| 仿 | fang32022a |
| 彷 | fang32022b |
| 白 | bai2 |
| 华 | hua22440 |
| 華 | hua24450 |
| 行 | xing22122 |
| 行 | hang22122 |

Although the above embodiment is described in connection with Chinese characters, the present invention can be similarly applied to other ideographic characters or symbols including Japanese and Korean. For example, a Japanese-language phonetic component can be used instead of the Pinyin or Zhuyin codes to provide spellings for Japanese characters.

In another embodiment, a mapping member can be provided to record and/or show the correlation between the spellings and the corresponding ideographic symbols. For example, the mapping member can be in the form of a table of various formats. In an exemplary embodiment, the mapping table can comprise a first list of the spellings and a second list of ideographic symbols and showing the correlation between the two lists. In one exemplary embodiment, the spellings can be sorted in an alphanumerical order so that the corresponding ideographic symbols can be sorted alphanumerically as well. In an exemplary embodiment, such as shown in Table 4, the mapping table can comprise eighty-five (85) sample spellings mapped with their corresponding Chinese characters.

TABLE 4

Sample Mapping Table of Spellings, Chinese Characters, and Big5 Codes

| Spellings | Chinese Characters | Big5 Codes |
| --- | --- | --- |
| a17122 | 阿 | aafc |
| a56102 | 啊 | b0da |
| ai10073 | 哀 | ab73 |
| ai10363 | 誒 | e44d |
| ai14313 | 埃 | ae4a |
| ai15303 | 挨 | aec1 |
| ai16303 | 唉 | adfc |
| ai16404 | 哎 | ab75 |
| ai20017 | 癌 | c0f9 |
| ai22261 | 皚 | bd4a |
| ai22814 | 敳 | e1f4 |
| ai25101 | 捱 | b1ba |
| ai27333 | 騃 | ef63 |
| ai31062 | 皑 | c647 |
| ai32326 | 伯 | ca64 |
| ai32748 | 欸 | d5d9 |
| ai34050 | 毐 | cb48 |
| ai34462 | 藹 | c4a7 |
| ai36303 | 脈 | cef7 |
| ai38244 | 矮 | b847 |
| ai40462 | 藹 | f4cf |

TABLE 4-continued

Sample Mapping Table of Spellings, Chinese Characters, and Big5 Codes

| Spellings | Chinese Characters | Big5 Codes |
| --- | --- | --- |
| ai41214 | 瑷 | c0f5 |
| ai41274 | 靉 | f957 |
| ai41768 | 礙 | c3aa |
| ai42024 | 愛 | b752 |
| ai42224 | 僾 | e4ed |
| ai43411 | 曖 | ed54 |
| ai44244 | 嫒 | e954 |
| ai44440a | 艾 | a6e3 |
| ai44440b | 薆 | ee49 |
| ai44612 | 堨 | d8a5 |
| ai44742 | 鴱 | ef7c |
| ai46204 | 噯 | bebc |
| ai46204 | 暧 | c0c7 |
| ai46881 | 賹 | eeb8 |
| ai47821 | 隘 | b969 |
| ai48214 | 鑀 | f669 |
| an10011 | 庵 | deca |
| an10021 | 庵 | b167 |
| an10066 | 諳 | bfda |
| an12324 | 侒 | cbc8 |
| an12374 | 岸 | cea6 |
| an13040 | 安 | a677 |
| an14314 | 垵 | ce50 |
| an14354 | 鞍 | be62 |
| an14460 | 菴 | dfd6 |
| an14772 | 鵪 | c44f |

TABLE 4-continued

Sample Mapping Table of Spellings, Chinese Characters, and Big5 Codes

| Spellings | Chinese Characters | Big5 Codes |
|---|---|---|
| an14844 | 婩 | d8c0 |
| an17026 | 暗 | df72 |
| an18010 | 盫 | ea75 |
| an18041 | 氨 | aef2 |
| an18066 | 鞌 | f54c |
| an18314 | 銨 | bbcf |
| an21077 | 唵 | e0d8 |
| an21417 | 玵 | cfcd |
| an26804 | 啽 | d875 |
| an32421 | 俺 | adcd |
| an34016 | 培 | d87e |
| an36401a | 唵 | d47b |
| an36401b | 腌 | d9a3 |
| an42224 | 岸 | a9a4 |
| an42623 | 偑 | e8f8 |
| an42772 | 匎 | d0ee |
| an43090 | 案 | aed7 |
| an43314 | 洝 | cf7d |
| an44244 | 婩 | d4e9 |
| an44394 | 桉 | d1db |
| an44440 | 荌 | d3b0 |
| an44471 | 菴 | b5da |
| an45304 | 按 | abf6 |
| an46006 | 暗 | b774 |
| an46036 | 黯 | c566 |
| an47171 | 匽 | cbd8 |

TABLE 4-continued

Sample Mapping Table of Spellings, Chinese Characters, and Big5 Codes

| Spellings | Chinese Characters | Big5 Codes |
|---|---|---|
| an47760 | 闇 | eeee |
| an48214 | 錌 | ebfe |
| ang17021 | 肮 | bbea |
| ang26012 | 昂 | a9f9 |
| ang27772 | 卬 | c957 |
| ang35503 | 軮 | dc42 |
| ang41561 | 醠 | eecc |
| ang45010 | 盎 | af73 |
| ao14412 | 坳 | cbfc |
| ao14492 | 枷 | cf62 |
| ao17777 | 凹 | a557 |
| ao20021 | 麈 | c3ef |

Additionally or alternatively, the mapping member can be provided to record and/or show the correlation between the codes of the existing Chinese coding system and their corresponding spellings in this invention. In an exemplary embodiment, such as shown in Table 5, the mapping table can comprise thirty-five (35) Big5 codes and map them with the spellings in this invention representing the same Chinese characters.

TABLE 5

Sample Mapping Table of Big5 Codes and Spellings of Same Symbols

| Big5 Codes | Spellings | Chinese Characters |
|---|---|---|
| a440 | yi11000 | 一 |
| a441 | yi31771 | 乙 |
| a442 | ding11020 | 丁 |
| a443 | qi14071 | 七 |
| a444 | nai31722 | 乃 |
| a445 | jiu34001 | 九 |
| a446 | le51720 | 了 |

TABLE 5-continued

Sample Mapping Table of Big5 Codes and Spellings of Same Symbols

| Big5 Codes | Spellings | Chinese Characters |
|---|---|---|
| a447 | er41010 | 二 |
| a448 | ren28000 | 人 |
| a44a | ru48000 | 入 |
| a44b | ba18000 | 八 |
| a44c | ji37721 | 几 |
| a44d | dao11722 | 刀 |
| a44e | diao11712 | 刁 |
| a44f | li44002 | 力 |
| a450 | bi32171 | 匕 |
| a451 | shi24000 | 十 |
| a452 | bu32300 | 卜 |
| a453 | you47740 | 又 |
| a454 | san11010 | 三 |
| a455 | xia41023 | 下 |
| a456 | zhang45000 | 丈 |
| a457 | shang42110 | 上 |
| a458 | ya18020 | 丫 |
| a459 | wan24001 | 丸 |
| a45a | fan27721 | 凡 |
| a45b | jiu32780 | 久 |
| a45c | yao12273 | 么 |
| a45d | ye34471 | 也 |
| a45e | qi38071 | 乞 |
| a45f | yu21040 | 于 |
| a460 | wang20071 | 亡 |
| a461 | wu41021 | 兀 |
| a462 | ren41732 | 刃 |
| a463 | shao22732 | 勺 |

In an alternative exemplary embodiment, the first component can be formed to represent a type of ideographic symbols. For example, the first component can be formed to represent non-pronounceable Chinese characters. In an exemplary embodiment, the first component can be formed to represent a type of non-pronounceable Chinese characters, such as the special symbols in the existing GB-2312, Big5, or CJK (i.e., The Chinese Japanese & Korean codes) Standard. Exemplary first components can include but are not limited to the following:

ZZGB: to represent all special symbols defined in the GB-2312 internal codes. In an exemplary embodiment, the second component can be the hex representation of the symbol in the GB-2312 internal code. For example, Roman numeral VIII has the hex representation of A2F8 in the GB-2312 code. The spelling for Roman numeral VIII can be ZZGBA2F8.

ZZBI: to represent all special symbols defined in the Big5 internal codes. In an exemplary embodiment, the second component can be the hex representation of the symbol in the Big5 internal code. For example, Roman numeral VIII has the hex representation of A2C0 in the Big5 code. The spelling for Roman numeral VIII can be ZZBIA2C0.

ZZCJK: to represent all special symbols or characters in the Chinese Japanese & Korean codes. In an exemplary embodiment, the second component can be the hex representation of the symbol in the Chinese Japanese & Korean codes.

In a further exemplary embodiment, the second component can be formed to identify the ideographic symbols logically in a specific type of symbols identified by the first component. In a first exemplary embodiment, where the first component represents all Roman numerals, the second component can be an Arabic numeral of 1 and above. In a preferred embodiment, the second component can be designated to correspond to the Roman numerals, such as by corresponding Arabic numerals. For example, for Roman numerals I, II, . . . , and X, the second component can be designated as 1, 2, . . . , 9, and 10, respectively. The resulting spellings can be ZZRM1, ZZRM2, . . . , and ZZRM10, respectively. Similarly, spelling ZZRM50 can be provided to represent Roman numeral L, ZZRM100 for Roman numeral C, ZZRM1000 for Roman numeral M, and so on. The spellings of the present invention can be formed in a logical form and thus easy to remember than the corresponding Roman numerals.

In another exemplary embodiment, the first component can be formed to represent all Greek alphabetic letters. For example, the first component can be ZZGK. In one exemplary embodiment, the second component can be the English-language alphabetic letters a, b, c, . . . , etc. to represent alpha, beta, gamma, etc., respectively.

In a further exemplary embodiment, the first component can be formed to represent all mathematics symbols. For example, the first component can be ZZMA. In one exemplary embodiment, the second component can be LT, LE, EQ, NQ, GT, GE, etc. to represent the mathematics symbols of "less than", "less than or equal to", "equal to", "not equal to", "greater than", "greater than or equal to", etc., respectively. In an alternative exemplary embodiment, the second component can be designated to represent plus, minus, multiply, divide, and other mathematics symbols.

In another exemplary embodiment, the first component can be formed to represent various Zhuyin symbols. For example, the first component can be ZZZY. In one exemplary embodiment, the second component can be bo, po, mo, fo, etc. to represent the corresponding Zhuyin symbols.

It will be appreciated that the various features described herein may be used singly or in any combination thereof. Therefore, the present invention is not limited to only the embodiments specifically described herein. While the foregoing description and drawings represent a preferred embodiment of the present invention, it will be understood that various additions, modifications, and substitutions may be made therein without departing from the spirit of the present invention. In particular, it will be clear to those skilled in the art that the present invention may be embodied in other specific forms, structures, arrangements, proportions, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive.

What is claimed is:

1. A medium containing a spelling for an ideographic symbol having a shape, said spelling comprising each of a first component, a second component, and a third component, the first component comprising alphanumerals providing a spelling of the phonetics of the ideographic symbol, the second component comprising alphanumerals providing an indication of the shape of the ideographic symbol, and the third component comprising a differentiator providing a unique identification of the ideographic symbol.

2. The medium of claim 1, wherein the ideographic symbol is a Chinese-language symbol.

3. The medium of claim 1, wherein the first component provides a sound portion and a tone portion of the ideographic symbol.

4. The medium of claim 3, wherein the sound portion and the tone portion are Pinyin spellings.

5. The medium of claim 1, wherein the shape of the ideographic symbol is indicated by a four-corner numerical index.

6. The medium of claim 1, wherein the third component is a differentiator whose value is either null or at least one alphanumeral.

7. The medium of claim 1, wherein the alphanumerals are English-language letters and Arabic numerals.

8. A table on a medium, which table comprises a first column and a second column wherein the first column provides a plurality of spellings for ideographic symbols having shapes, each spelling comprising each of a first component, a second component, and a third component, the first component comprising alphanumerals providing a spelling of the phonetics of the ideographic symbol, the second component comprising alphanumerals providing an indication of the share of the ideographic symbol, and the third component comprising a differentiator providing a unique identification of the ideographic symbol and wherein the second column provides a plurality of the corresponding ideographic symbols.

* * * * *